(12) United States Patent
Nwabuzor

(10) Patent No.: US 8,564,145 B2
(45) Date of Patent: Oct. 22, 2013

(54) UNIVERSAL AUTOMATIC CORD REELING DEVICE

(76) Inventor: Chukwuka E. Nwabuzor, Hillside, NJ (US)

( * ) Notice: Subject to any disclaimer, the term of this patent is extended or adjusted under 35 U.S.C. 154(b) by 215 days.

(21) Appl. No.: 13/134,153

(22) Filed: May 31, 2011

(65) Prior Publication Data

US 2012/0306216 A1  Dec. 6, 2012

(51) Int. Cl.
*H02K 7/18* (2006.01)

(52) U.S. Cl.
USPC ............................................ 290/1 R

(58) Field of Classification Search
USPC ............ 290/1 R; 242/376, 376.1, 378, 378.1, 242/378.4
See application file for complete search history.

(56) References Cited

U.S. PATENT DOCUMENTS

| | | | | | |
|---|---|---|---|---|---|
| 2,181,141 | A | * | 11/1939 | Lovegran | 242/379 |
| 2,606,067 | A | * | 8/1952 | Roark | 242/378 |
| 2,673,694 | A | * | 3/1954 | Howell | 242/378.4 |
| 4,132,367 | A | * | 1/1979 | Ineson et al. | 242/376 |
| 7,360,320 | B2 | * | 4/2008 | Kelley | 242/376 |
| 8,365,887 | B2 | * | 2/2013 | Fischer | 242/378.1 |

* cited by examiner

*Primary Examiner* — Tho D Ta
(74) *Attorney, Agent, or Firm* — Usha S. Koshy

(57) ABSTRACT

An automatic universal cord reeling device capable of consolidating, organizing and storing cords and flexible tubes from any source comprising, a two tiered spool and a spring motor used to drive the mechanism to provide stored energy to the system through the operations of a set of gears and a spring loaded plunger and detent system. In an alternate embodiment of the invention, a mini alternator may be attached to the spring motor drum of the system to generate electric current which is stored in a battery pack incorporated within the system. In this embodiment, the stored energy in the form of electric current can be tapped through a plug to drive an electronic mobile or other device.

20 Claims, 10 Drawing Sheets

UNIVERSAL AUTOMATIC CORD REELING DEVICE

FIELD OF THE INVENTION

The present invention generally relates to cord reeling devices. More particularly, the invention relates to a cord reeling device that uses a planetary gear system, a spring motor, and a spring loaded detent mechanism to wind and unwind a variety of cords and flexible tubes organized around a two tiered spool, housed within a cylindrical chassis.

BACKGROUND OF THE INVENTION

Storage and retrieval of cords connected to a variety of machines, appliances and gadgets become cumbersome when the cords get twisted upon themselves or around the machines, appliances and gadgets in use. Prior art have tried to resolve this issue through the use of built-in cord reeling devices. These built-in cord reeling mechanisms are specific to the machines, appliances and gadgets and do not allow for the disassembly and substitution of cables or tubes within their sealed chassis. Machines, appliances and gadgets that do not have built-in cord reeling mechanisms require bunching the cords up and leaving them behind or to the side of the machines, appliances or gadgets to keep them out of the way while using these items. There is a need in the art for a cord reeling device that can organize and house the lengthy cords of machines, appliances or gadgets and facilitate the release of the cords to the desired length when needed and retracting the cords and storing them when not in use.

Cord reeling devices that are constructed to house a variety of cables and flexible tubes and allow for the easy insertion and removal of these cables and tubes are not well known in the art. The majority of cord reeling devices in the prior art are designed to house only a specific type and size of cord or flexible tube for which the device was constructed and do not allow for the removal and insertion of other cords and flexible tubes into the device.

Thus there is a need in the art for a universal cord reeling device that facilitates the organization, storage and removal of cables, cords and flexible tubes from any source. The present invention overcomes a deficiency in the art by providing such a universal cord reeling device.

SUMMARY OF THE INVENTION

The present invention is a universal automatic cord reeling device that can be used to organize, store and retrieve a variety of cables, cords or flexible tubes from any source that needs the consolidation and organization of cords and tubes.

In an exemplary embodiment of the present invention, a spring motor provides the stored energy to drive the mechanism of the cord reeling device. The spring motor's output drum is attached to a spool, or wheel which is driven by a set of gears. In this embodiment of the invention, the spring motor located at the bottom-most level of the interior casing of the bottom cover of the device is attached to gear 1 through the motor's output drum making it the driving gear of the entire mechanism of the device. In this embodiment, gear 1 links to a second spur gear, gear 2 of smaller diameter and fewer teeth which in turn links to an internal gear, gear 3 with a larger diameter and more teeth than gears 1 and 2. Gear 3 is molded to the spool which is comprised of two tiers separated by three cylindrical walls which house the cords or flexible tubes between these walls. Gear 3 functions to convert the high RPM and torque generated by gear 1 as the spring decompresses and relaxes, into a lower RPM so that the cord does not reel in too quickly. As the two ends of the cord or flexible tube are pulled apart, they exert a twisting force upon the spool, causing the spool to rotate. Rotation of the spool with its attached gear 3 rotates gear 1 and gear 2 which in turn compresses the spring motor causing it to rotate and coil. When the two ends of the cord or flexible tube are released, the spring motor decompresses, releasing the stored energy generated by the rotation of the spool resulting in the cord or tube winding back into the spool.

In this exemplary embodiment of the invention, a detent system is used to control the force of the spring motor. The interior casing of the bottom cover of the cord reeling device of the invention, houses a spring-loaded ball plunger which extends straight up to the bottom of the spool. As the spool rotates, the ball bearing within the plunger rolls against the underside of the spool and comes in contact and aligns with a small indent located on the underside of the spool, causing the spring inside the plunger to push the ball upwards into the indent which stops the spool and gears 1, 2 and 3 from rotating. To initiate the spool's rotation again requires the cords to be pulled apart as before and the entire cycle is then repeated.

The other gears of importance in the operation of the exemplary embodiment of the cord reeling device of the present invention are gear's 4, 5 and 6. Gear 4 is an external spur gear with a hollow shaft that houses the spring-loaded plunger and helps to lock the mechanism by rotating and causing the plunger to move upward and align with the indent at the bottom surface of the spool which in turn prevents the spool and gears, 1, 2, 3 as well as the spring motor from rotating. Gear 5, the internal segment gear which rotates about the central rotation cylinder, engages with gear 4 and is used to lock the gear mechanism in place. Gear 6, known as the threaded standoff gear works in conjunction with the internal segment gear 5 to initiate the smooth retraction mechanism and is designed and used to link the spool and the rotary damper so that they rotate concurrently.

The exemplary embodiment of the present invention also has a rack and track system that has the rack interacting with the standoff gear 6 when the rotation of that gear is restricted. The other feature of the exemplary embodiment of the invention is a lock and release lever that is attached to gear 4 and when pushed into position works in conjunction with gear 5 to lock the mechanism in place.

In another embodiment of the present invention, other types of springs, including but not limited to clock, power, constant force, spiral, or torsion springs may also be used as well as mechanically driven or electrically driven motors in place of the spring motor. However, a spring motor is preferred because it provides a near constant torque, requires no energy source outside from the person operating it, and allows very simple attachment to a gear.

In yet another embodiment of the present invention, an extended battery pack is incorporated within the system. In this embodiment, the shaft of a mini alternator is attached to the spring motor's output drum so that they rotate concurrently to generate an electrical current which travels through the alternator wires to charge the battery. An electronic mobile or other device may tap into the energy stored in the battery pack through a plug attached to the system.

The universal construction and configuration of the cord reeling device of the present invention permits the housing of cords and flexible tubes from a variety of sources and facilitates their automatic reeling, consolidating, organizing and use for their intended purposes. The components of the cord reeling device of the invention can be constructed of any rigid material including but not limited to metal or plastic.

The features and embodiments of the present invention of the universal cord reeling device will become obvious to one skilled in the art when reviewed in conjunction with the ensuing description of the drawings, detailed description of the invention and the claims that follow.

DETAILED DESCRIPTION OF THE INVENTION

The present invention is a universal automatic cord reeling device with a two tiered spool for winding cords or flexible tubes, driven by a spring motor and a set of gears. The device uses a detent system to control the force of the spring motor and stop the mechanism at set intervals. The entire mechanism of the device is housed within a chassis with a top cover and a bottom cover which are cylindrically shaped in an exemplary embodiment of the invention, but may take any other shape such as a cube in other embodiments. Described below through the attached drawings and their detailed description is an exemplary embodiment of the present invention.

Figure 1:
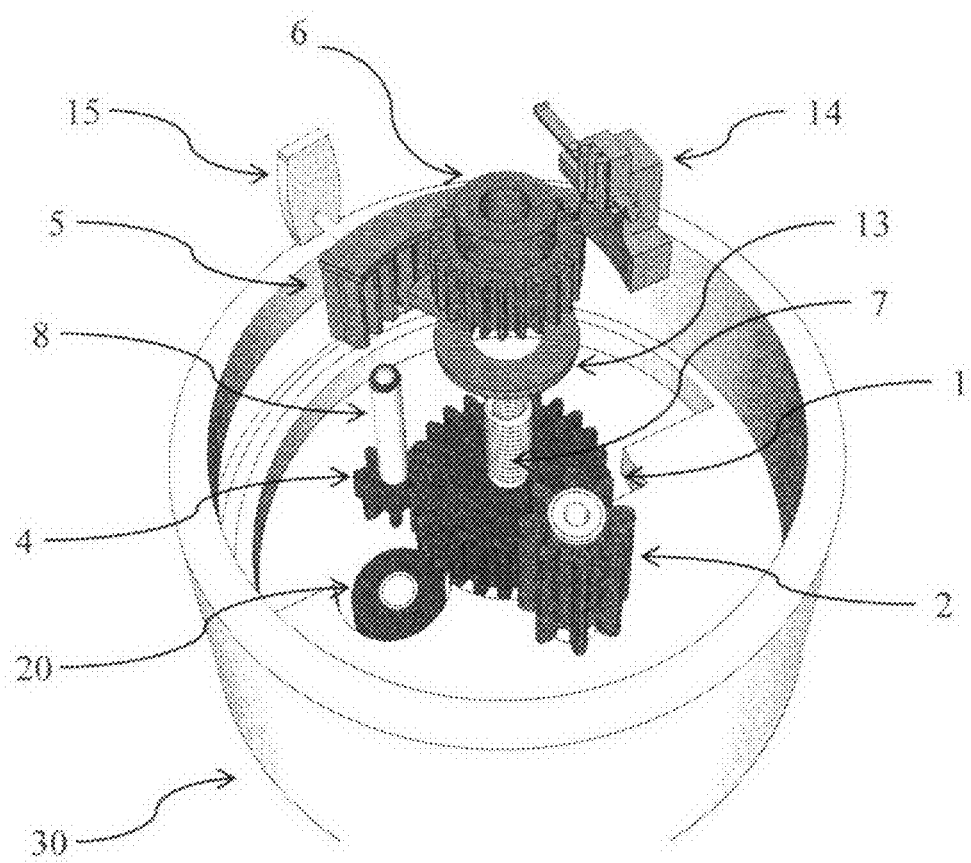
FIG. 1 is a plan view of the universal cord reeling system.

Referring now to the figures, more specifically to FIG. 1, a plan view of the cord reeling device 30 is shown with gear 1 inserted through the central rotation cylinder 7 which rises from a hole at the center of the spring motor 20 output drum. The attachment of gear 1 to the spring motor 20 output drum makes gear 1 the drive gear for the entire mechanism of the cord reeling device 30. Gear 1 links to gear 2, the idler gear with a smaller diameter and fewer teeth than gear 1. A spring ball plunger 8 is located within a hollow threaded shaft and is screwed into position at the top of the shaft which is attached to gear 4 so that they share the same axis of rotation, and their rotation is concurrent. An internal segment gear 5 rotates about the central rotational cylinder 7 on a ring 13 and engages with gear 4. The segment gear 5 is shaped like a wedge and has a cutout portion to operate around shafts and is attached to the rack portion of the rack and track system 14 and a lock and release lever 15 which extends to the outside of the bottom cover of the device. As the lever 15 is moved along the outside of the bottom cover, gear 5 is forced into motion and engages with gear 4. As gear 4 rotates, the threaded shaft holding the ball plunger 8 also rotates and moves up vertically to engage with the inner rim of the indent on the underside of spool 10. Gear 5 is also attached to the rack and track system 14 and pushes and pulls the rack into place as it rotates. The rack and track system 14 is fitted over a track so that its motion is linear. The rack portion of the rack and track system 14 may take any shape so that its' teeth interacts with the standoff gear 6 only when the rotation of the standoff gear 6 is restricted. The lock and release lever 15 works with segment gear 5 to lock the mechanism in place and may take any shape such as a sphere with a shaft protruding from it.

Figure 2:
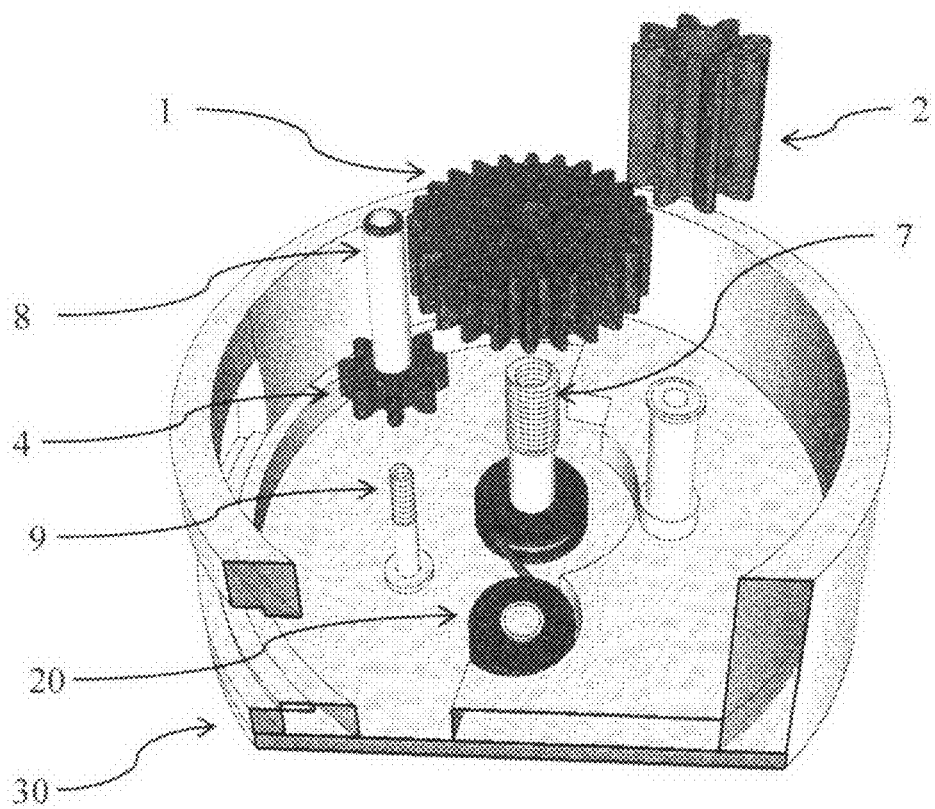
FIG. 2 is an exploded perspective view illustrating the positioning of the spring motor output drum and elevational views of gear 1, gear 2, and gear 4.

FIG. 2 is an exploded perspective view illustrating the positioning of the spring motor output drum at the bottom center of the inner casing of the bottom cover and elevational views of gear 1, gear 2, and gear 4. The central rotation cylinder 7 is placed in a hole at the center of the spring motor 20 central output drum. The ball plunger 8 is threaded on the inside and screwed into position at the top half of the threaded shaft 9. The threaded shaft 9 is also attached to gear 4 so that they share the same axis of rotation and as they rotate, they also move vertically upward.

Figure 3:
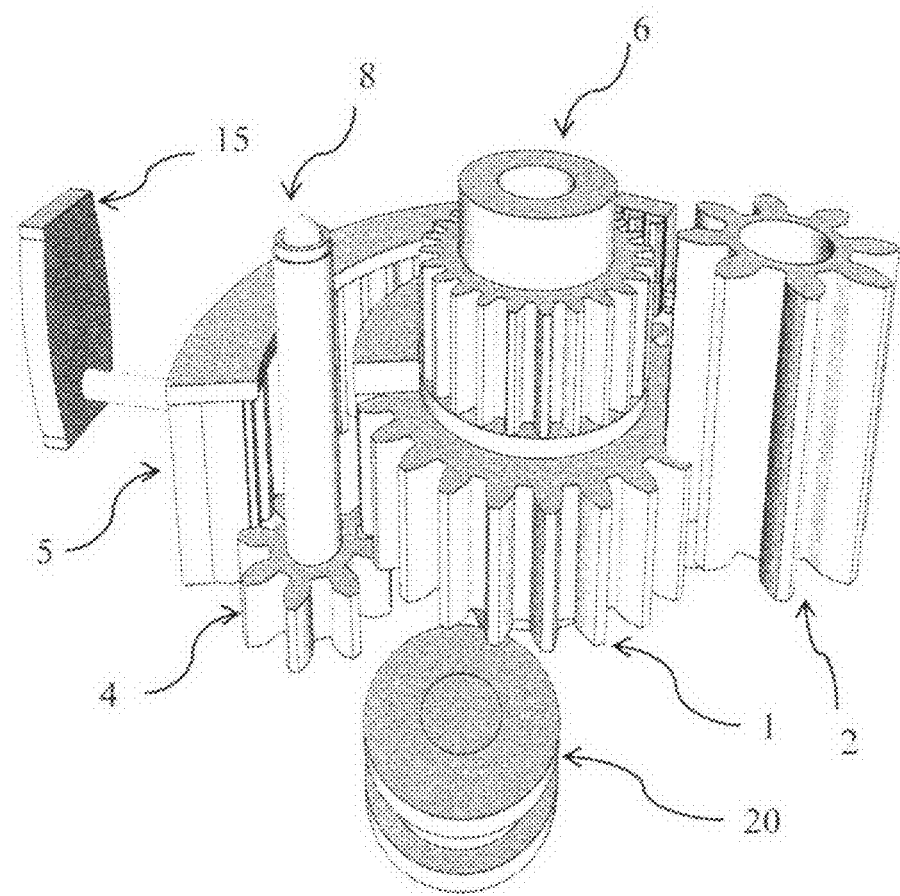
FIG. 3 is a perspective view illustration of the alignment of gears over the spring motor.

FIG. 3 is a perspective view of the alignment and positioning of gear 1, gear 2, gear 4, gear 5 and gear 6 over and around the spring motor 20 of the universal cord reeling device 30 of the present invention. The attachment of segment gear 5 to the lock and release lever can be clearly observed in this figure.

Figure 4:
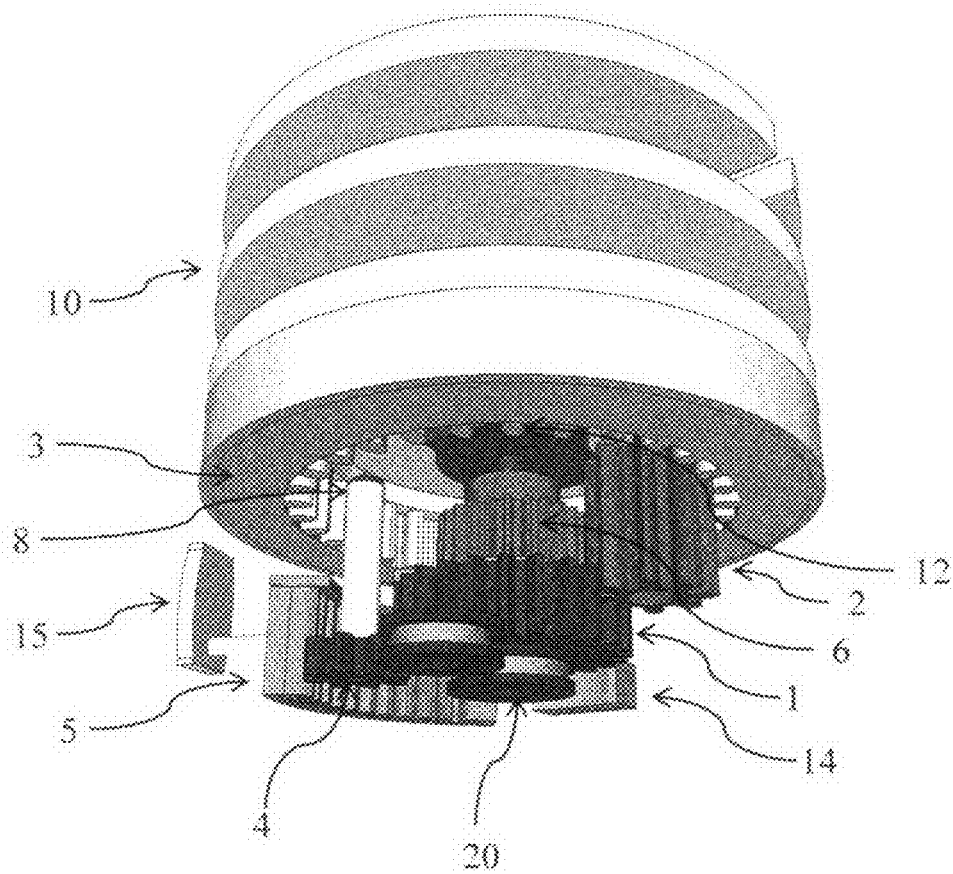
FIG. 4 is a perspective view illustrating the dimensions of the two tiered spool as viewed from the side and the relationship and alignment of the spool to the interconnected gears, spring motor, plunger and the lock and release lever.

FIG. 4 is a perspective view illustrating the engagement of the spool over the interconnected gears, spring motor and ball plunger 8. Spool 10 is molded and attached to the internal spur gear 3 which has a larger diameter and more teeth than gear 1 and gear 2. Gear 3 rotates more slowly than gear 1 and gear 2 as it converts the high RPM and torque of gear 1 generated when the spring motor decompresses and relaxes into a lower RPM so that the cord does not rotate and reel in too quickly. Spool 10 is comprised of a hollow cylinder with two tiers which are separated and defined by three flat walls that protrude out from the cylinder. Spool 10 is used to organize and house the cord or flexible tube between these walls. The walls are slotted so that the top tier can hold one half of the cord's length, and the bottom tier holds the other half. A rotary damper 12 is attached to the bottom center of spool 10 to slow down the motion of the spool so that the cord or tube reels in smoothly and automatically.

Figure 5:
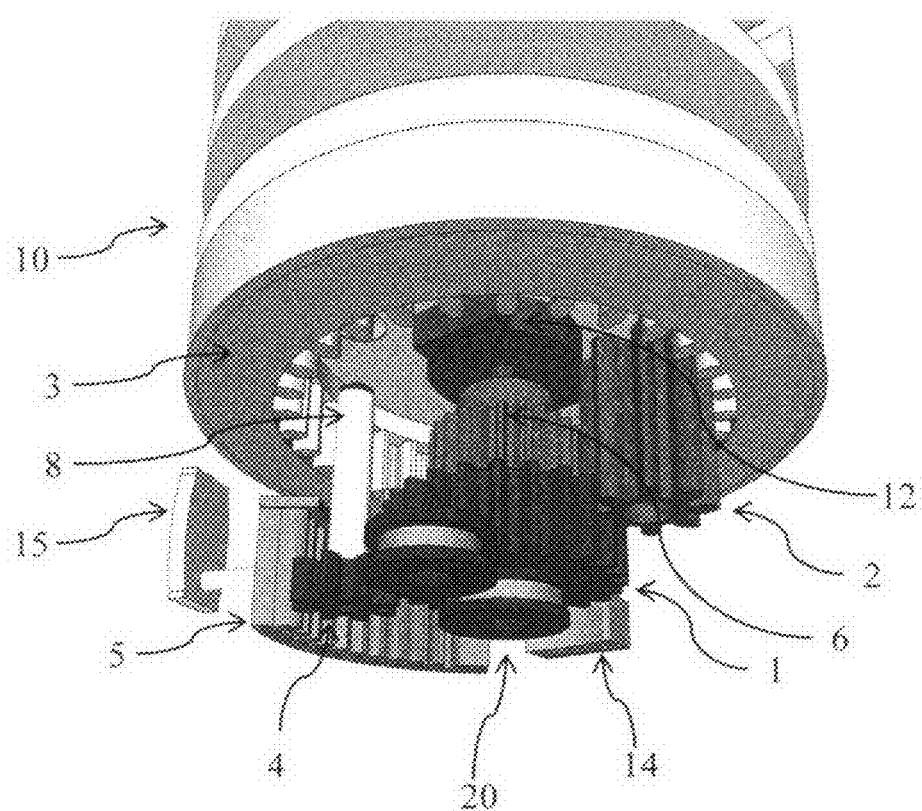
FIG. 5 is another close-up perspective view illustrating the engagement of the spool over the interconnected gears, spring motor, plunger and the lock and release lever.

FIG. 5 is another close-up perspective view illustrating the engagement of spool 10 over the interconnected gears 1, 2, 3, 4, 5, 6, spring motor 20, the spring loaded plunger 8, rotary damper 12, the rack and track system 14 and the lock release lever 15. The lock and release lever 15 attached to segment gear 5 extends to the outside of the bottom cover of the device. As lever 15 is moved along the outside of the bottom cover, gear 5 is forced into motion to engage with gear 4 ad sets the gear into motion concurrently with the shaft holding the ball plunger 8. As the ball plunger 8 moves vertically upward as it rotates, it engages with the indent located at the base of spool 10 and impedes the spool's rotation.

Figure 6:
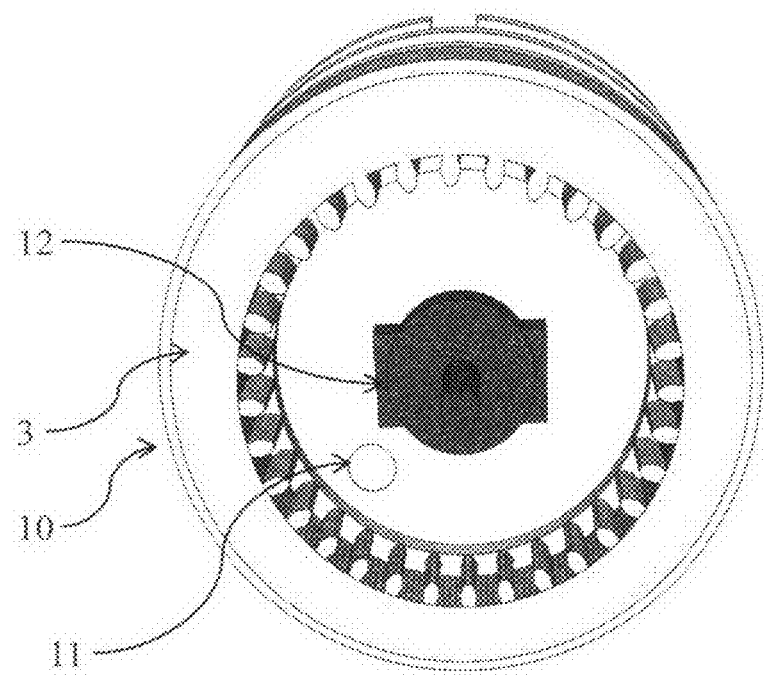
FIG. 6 is a perspective view of the spool from the bottom illustrating the positioning of the rotary damper and the indent.

FIG. 6 is a perspective view of spool 10 from the bottom with gear 3 molded to the spool and illustrating the positioning of indent 11 which when aligned with the top of the spring ball plunger 8 forms the detent system that stops spool 10 from rotating. The rotary damper 12 is attached to the center bottom of spool 10 to allow for a slow retraction of the spool upon recoil so that the cord or tube reels in smoothly and automatically.

Figure 7:
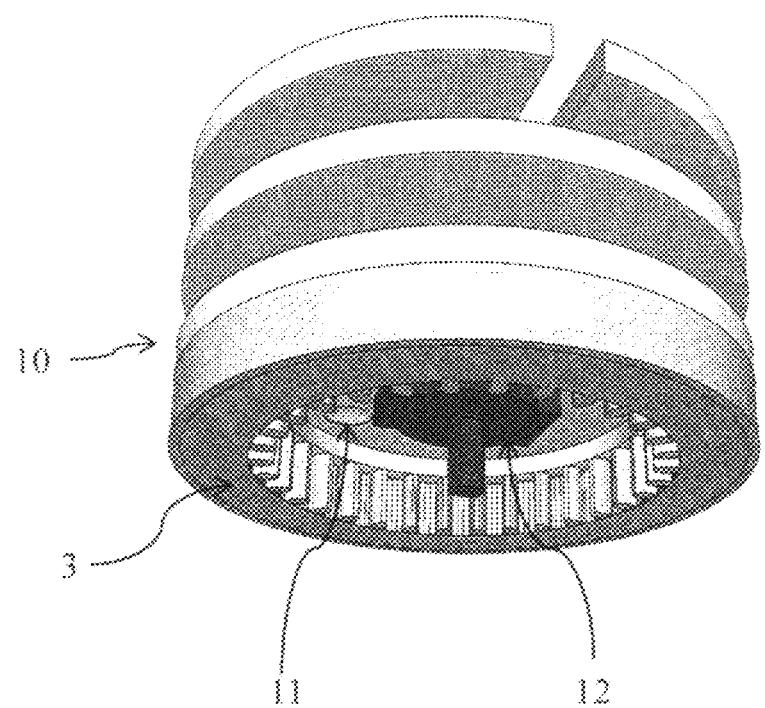
FIG. 7 is a perspective view of the spool from the side illustrating the two tiers of the spool and with gear 3 molded to the spool and the positioning of the damper and the indent.

FIG. 7 is a perspective view of spool 10 from the side, illustrating the two tiers and the positioning of the rotary damper 12 and the indent 11.

Figure 8:
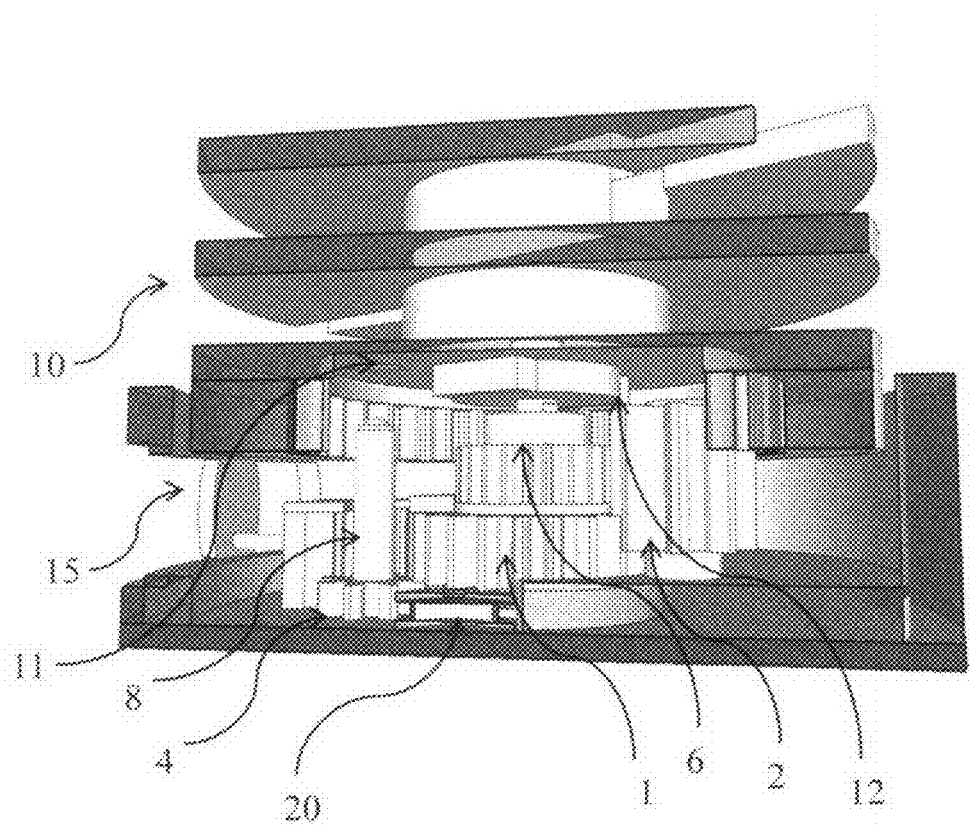
FIG. 8 is a cross sectional view of the universal cord reeling device illustrating the configuration of the spool and the various parts of the device.

FIG. 8 is a cross sectional view of the universal cord reeling device 30 illustrating the configuration of spool 10 and the various parts of the device. The walls of spool 10 are slotted so that the top tier can hold one half of the cord or tube's length, and the bottom tier can hold the other half. The cord or tube is placed at the half way point of spool 10 through a slot in the top wall where half of the cord is wound in. The other half of the cord or tube is dropped through a second slot in the spool's middle wall to the bottom level of spool 10, where it is wound in the opposite direction of the first half of the cord. The top cover of the cord reeling device 30 is then screwed on. As the two ends of the cord or tube are pulled apart, they exert a twisting force on spool 10 which causes the spool to rotate. Rotation of spool 10 and gear 3 molded to it causes gear 1 and gear 2 to rotate which in turn compresses the spring motor 20, causing it to rotate and coil. At this point to relieve the tension, the spring motor 20 will want to release the energy initiated by the rotation of the spool. This is accomplished by releasing the two ends of the cord or tube causing the spring motor 20 to decompress which in turn makes the cord or tube wind back into spool 10.

The force of the spring motor 20 is controlled by a detent system. The spring loaded plunger 8 housed on the inside base of the bottom cover next to the spring motor 20 and attached to gear 4 extends straight up to the bottom of spool 10 and aligns with indent 11 on the underside of spool 10 as it rotates. This alignment makes the spring inside the plunger 8 push the ball upwards into the indent and the force exerted by the plunger's spring through the ball bearing stops the spool 10 from rotating and in turn stops gears 1, 2 and 3 from rotating. Ultimately, the driving spring motor 20 is stopped from recoiling as well and additional energy is required to begin the spool 10 rotation again. The additional energy is generated by pulling the cord or tube outwards again and the cycle is repeated. In order for the ball bearing on the plunger 8 to engage the indent 11 properly, the cord or tube must be controlled and allowed to engage slowly so that the initial force that the spring exerts on the spool via gear 1 and gear 2 does not overcome the plunger's initial force on the spool. The rotary damper 12 facilitates slowing the motion of the spool 10 causing the cord or tube to reel in slowly and smoothly.

Figure 9:
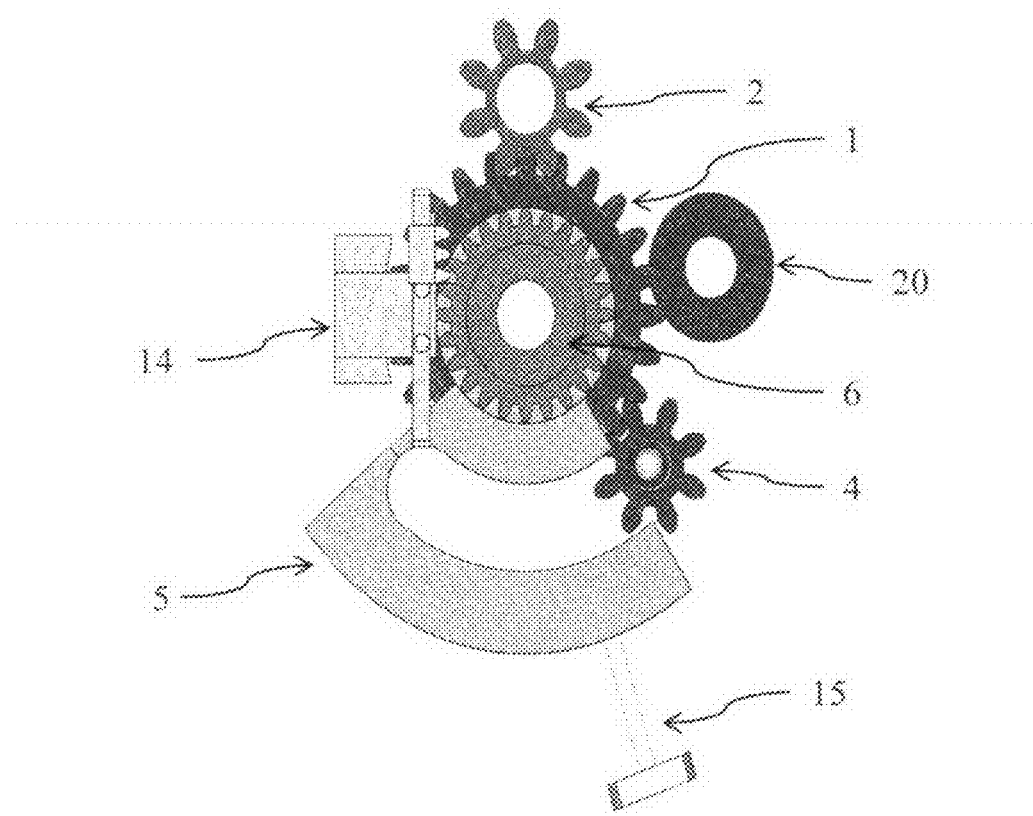
FIG. 9 is a top plan view of the universal cord reeling device.

FIG. 9 is a top plan view of the universal cord reeling device showing the relationship and configuration of the spring motor 20 and gears 1, 2, 4, 5 and 6. The view also shows the positioning of the rack and track system 14 and the lock and release lever 15 and their relationship to the gears.

Figure 10:
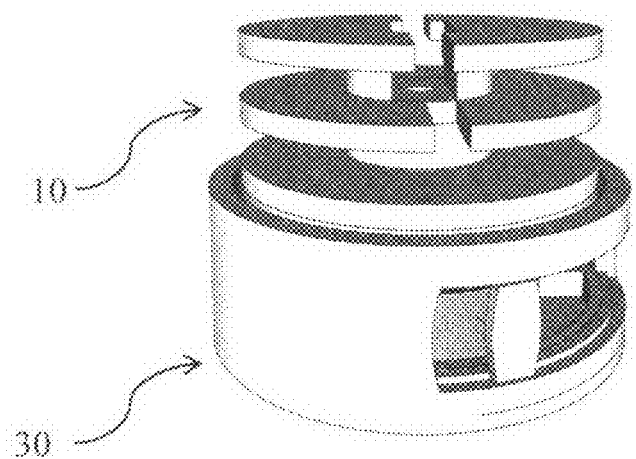
FIG. 10a is a side perspective view of the universal cord reeling device with a clear view of the two tiered spool positioned in the center of the device.
FIG. 10b is a top view of the spool showing the hole through which it is mounted on the shaft over the spring motor.
Figure 10:
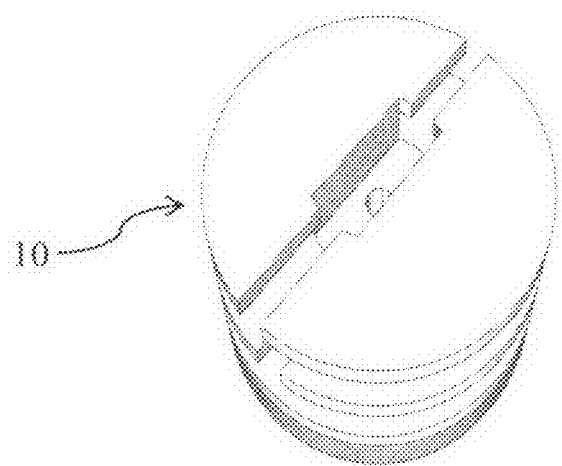

FIG. 10*a* is a side perspective view of the universal cord reeling device 30 with a clear view of the two tiered spool 10 positioned in the center of the device.

FIG. 10*b* is a top view of the spool 10 of the device showing the tiered structure of the spool.

The foregoing description of the invention of the universal cord reeling device of the present invention through its figures and preferred embodiments should not be construed to limit the scope of the invention. It should be understood and obvious to one skilled in the art that the embodiments of the invention thus described may be further modified without departing from the spirit and scope of the invention as set forth in the appended claims.

What is claimed is:

1. A universal automatic cord reeling device comprising:
   a top cover;
   a bottom cover; and
   a mechanism, the mechanism comprising:
   a spring motor with a central rotation cylinder and an output drum;
   an interconnected gear set having a gear 1, a gear 2, a gear 3, a gear 4, a gear 5 and a gear 6, wherein said gear 1 inserted through said central rotation cylinder which rises from a hole at a center of said spring motor output drum;
   a spool for winding and housing cords and flexible tubes, wherein said spool is attached to said gear 3;
   a spring-loaded ball plunger is attached to said gear 4;
   a detent system attached to said spool, wherein said detent system aligned with said spring-loaded ball plunger to stop said spool from rotating;
   a rotary damper attached to a bottom center of said spool to slow down the motion of said spool so that said cord or flexible tube reels in smoothly and automatically;
   a rack and track system attached to said gear 4 and said gear 5; and
   a lock and release lever extends to an outside of said bottom cover, wherein said lock and release lever attached to said gear 4;
   said top cover and bottom cover to enclose the mechanism.

2. The universal automatic cord reeling device of claim 1 wherein the spring motor generates the energy to drive the mechanism of the device.

3. The universal automatic cord reeling device of claim 1 wherein said gear 1 is a central spur and a drive gear.

4. The universal automatic cord reeling device of claim 1 wherein said gear 2 is an idler spur gear with fewer teeth and smaller diameter interacting with said gear 1.

5. The universal automatic cord reeling device of claim 1 wherein said gear 3 is an internal driven spur gear molded to the spool and has more teeth and a larger diameter than said gear 1 and said gear 2.

6. The universal automatic cord reeling device of claim 1 wherein the spool is comprised of two tiers separated by three cylindrical walls.

7. The universal automatic cord reeling device of claim 1 wherein said gear 4 is an external spur gear with a hollow shaft used to house the spring-loaded ball plunger.

8. The universal automatic cord reeling device of claim 1 wherein the spring loaded ball plunger extends straight up and aligns with an indent on the underside of the spool to form the detent system to stop the spool rotation.

9. The universal automatic cord reeling device of claim 1 wherein, said gear 5 is an internal segment gear attached to the rack and track system and is used to lock the mechanism in place through said gear 4.

10. The universal automatic cord reeling device of claim 1 wherein said gear 6 is a threaded standoff gear designed to link the spool and the rotary damper so that they rotate concurrently and in conjunction with said gear 5 to initiate the smooth retraction mechanism.

11. The universal automatic cord reeling device of claim 1 wherein the lock and release lever is attached to said gear 4 and works with said gear 5 to lock the mechanism in place.

12. The universal automatic cord reeling device of claim 1 wherein the spring motor can be replaced by another form of spring such as a clock, power, constant force, spiral or torsion spring.

13. The universal automatic cord reeling device of claim 1 wherein the spring motor output drum may be attached to the shaft of a mini alternator so that they rotate concurrently to generate an electric current to charge a battery pack located within the device.

14. The universal automatic cord reeling device of claim 13 wherein the electrical current generated through the concurrent rotation of the spring motor and the mini alternator and stored in the battery pack may be tapped through a plug to drive an electronic mobile or other device.

15. The universal automatic cord reeling device of claim 1 wherein the device may have more than one said gear 1 and more than one said gear 2.

16. The universal automatic cord reeling device of claim 1 wherein the components of the cord reeling device may be constructed of any rigid material known in the art, including but not limited to metal or plastic.

17. A universal automatic cord reeling device comprising:
a top cover;
a bottom cover; and
a mechanism, the mechanism comprising:
  a spring motor with an output drum attached to a spool;
  said spool having a hole in a center and inserted over a central rotation cylinder attached to a center of said output drum of the said spring motor;
  said spool having a rotary damper and a detent system at its base;
  said spool molded to an internal driven spur gear 3;
  a central spur and drive gear 1 inserted over the said central rotation cylinder and attached to the said spring motor output drum;
  an idler spur gear 2 attached to the said central spur drive gear 1 and the internal driven spur gear 3;
  an external spur gear 4 with a hollow shaft holding a spring-loaded plunger extending up to a bottom of said spool to engage with said detent system to stop the rotation of the spool;
  an internal segment gear 5 to lock the mechanism in place through said external spur gear 4;
  a standoff spur gear 6 that links said spool and said rotary damper;
  a rack and track system that interacts with the standoff spur gear 6 and said internal segment gear 5; and
  a lock and release lever attached to said external gear 4 and works with said internal segment gear 5 to lock the mechanism in place;
said top and bottom cover to hold and protect the mechanism of said universal automatic cord reeling device.

18. A method of using said universal automatic cord reeling device as in claim 17, said method comprising:
placing a cord or flexible tube at its halfway point through a slot in the top wall of the spool winding half the cord;
placing the second half of the cord or flexible tube by dropping it through a second slot in a middle wall of the spool to a bottom level of the spool where it is wound in the opposite direction to a first half of the cord or flexible tube;
placing and screwing on the top cover of the device;
pulling the two ends of the cord or flexible tube apart to exert a twisting force on the spool causing the spool to rotate;
rotation of the spool and said internal driven spur gear 3 molded to the spool causing said gear 1 and said gear 2 to rotate and compress the spring motor causing it to rotate and coil; and
releasing the two ends of the cord or flexible tube causing the spring motor to decompress and the cord or flexible tube to wind back into the spool.

19. The method of using said universal automatic cord reeling device as in claim 18, said method comprising the use of a spring loaded plunger and said detent system to impede the motion of the spool and stop it at set intervals to release the cord or flexible tube to the desired length.

20. The universal cord reeling device of claim 17 wherein the spring motor output drum may be attached to the shaft of a mini alternator so that they rotate concurrently to generate an electric current to charge a battery pack located within the device which can be tapped through a plug to drive an electronic mobile or other device.

\* \* \* \* \*